Oct. 15, 1940.  G. MUFFLY  2,217,806
SEISMOGRAPH PROSPECTING
Filed July 29, 1937     3 Sheets-Sheet 1
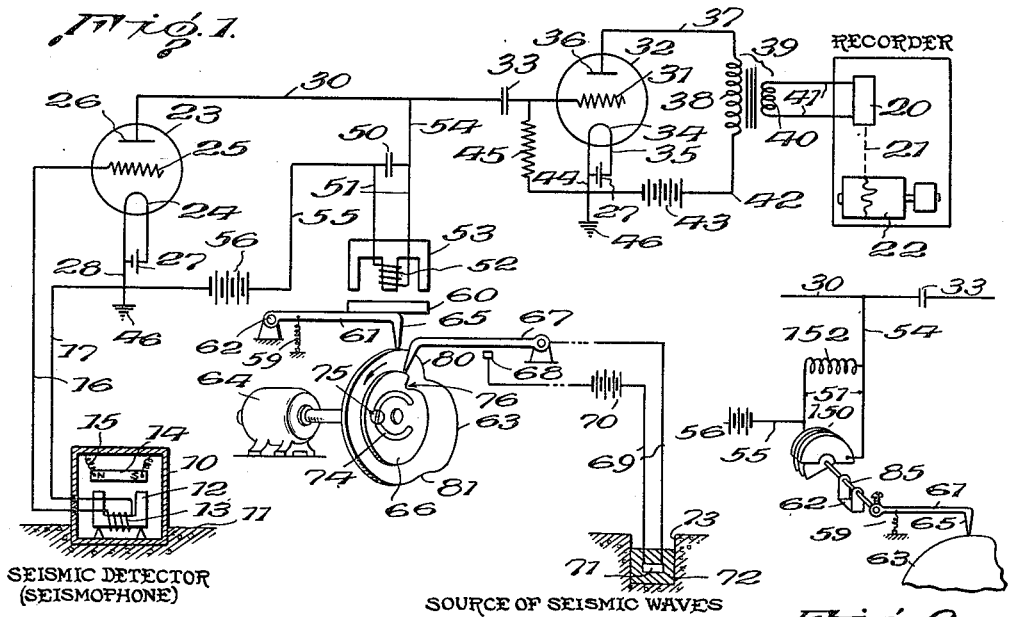
Fig. 1.
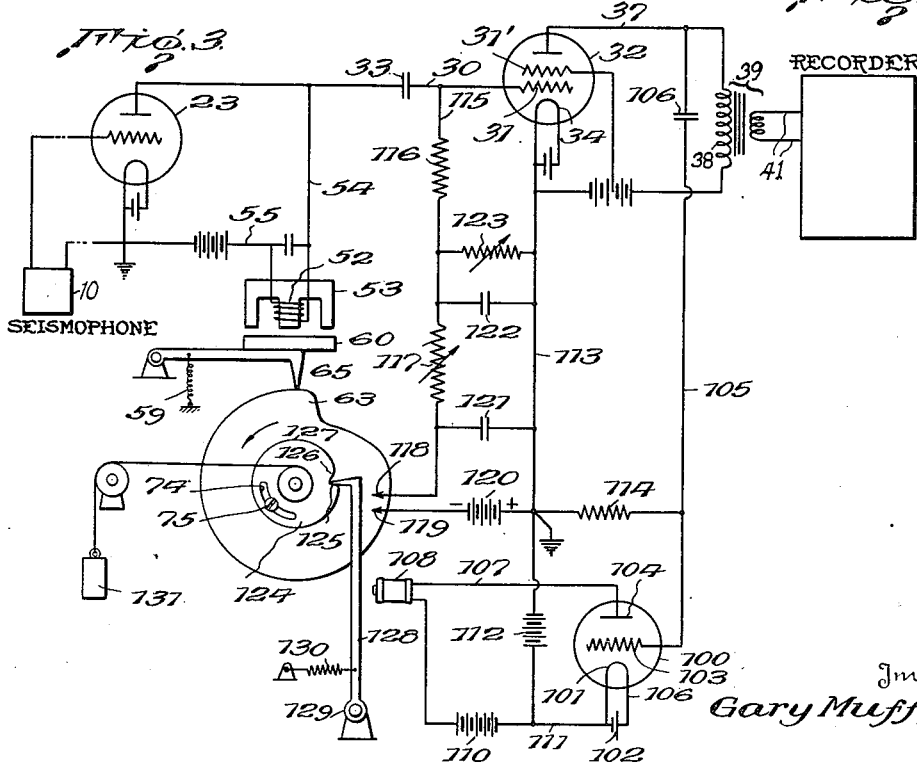
Fig. 2.
Fig. 3.
Inventor
Gary Muffly,
By G. M. Houghton
his Attorney

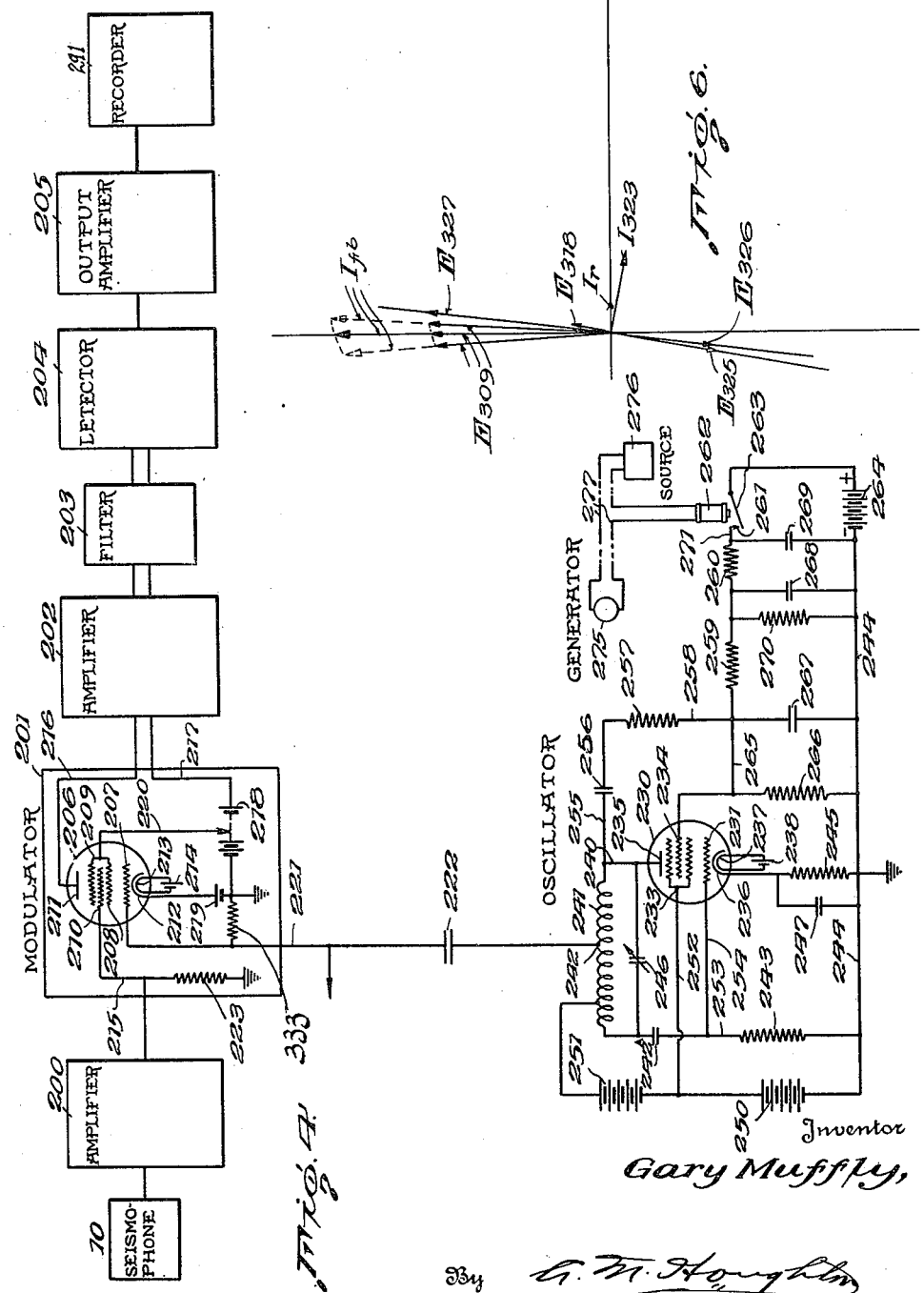

Oct. 15, 1940.　　　　G. MUFFLY　　　　2,217,806
SEISMOGRAPH PROSPECTING
Filed July 29, 1937　　　　3 Sheets-Sheet 3
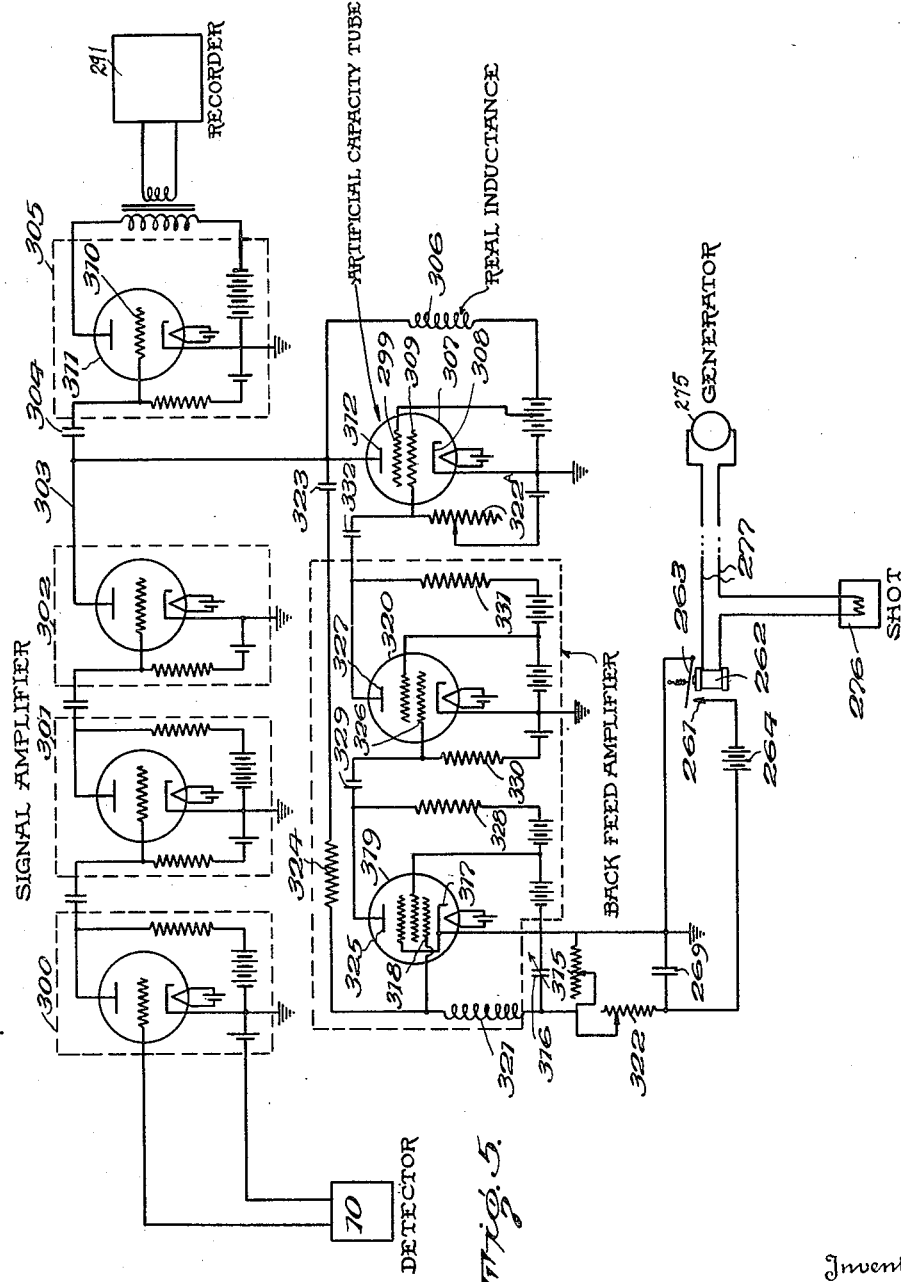

Patented Oct. 15, 1940

2,217,806

UNITED STATES PATENT OFFICE 2,217,806

SEISMOGRAPH PROSPECTING

Gary Muffly, Oakmont, Pa., assignor to Gulf Research & Development Company, Pittsburgh, Pa., a corporation of Delaware Application July 29, 1937, Serial No. 156,420

12 Claims. (Cl. 177—352)

This invention or discovery relates to seismograph prospecting; and it comprises an improved method of amplifying seismophone signals to secure clear and readily interpretable records, said method comprising amplifying seismophone signals by an electronic circuit, and tuning the circuit, that is varying the frequency response thereof, as a predetermined function of time; and it further comprises apparatus for carrying out such method, including a seismophone, a recorder, and an electronic amplifier having an element adapted, upon being actuated, to change the frequency response of the amplifier, and control means for actuating said element as a predetermined function of time; all as more fully hereinafter set forth and as claimed.

In seismograph prospecting a source of terrestrial vibrations (seismic waves) is set up at one point on the earth, and the resulting earth vibrations are detected and recorded at one or more points spaced from the source. The direction of travel of the seismic waves below ground is changed upon passage through media of varying density or upon meeting rock interfaces; e. g., strata interfaces, fault planes, etc. The source of vibration is usually an exploding charge of dynamite, in which case vibrations are sent out including many frequencies over a wide range. The waves, after passage through the earth, are detected by a seismic detector or seismophone, which ordinarily consists of a case, put in solid contact with the earth, a fixed coil and pole piece in the case, and a magnet suspended on springs in the case adjacent the coil and pole piece. On vibration of the earth, the magnet tends to remain stationary while the coil and pole piece oscillate with respect thereto, thereby setting up an oscillatory electric impulse corresponding to motion of the earth. The detector is sometimes arranged to produce an electrical response corresponding to the amplitude of the earth tremors, sometimes to the velocity of vibration, and sometimes to the acceleration.

The seismophone is connected to a vacuum tube (electronic) amplifier, which amplifies the rather weak energy output of the seismophone. The amplifier is connected to a recorder, usually of the oscillograph type, wherein the oscillating, amplified detector output is caused to make a focussed beam of light move over a traveling sensitized paper or film, thus producing on the paper a wavy trace corresponding to the earth vibrations. The trace, properly interpreted, gives information as to sub-surface structures.

The waves received at the seismophone commonly arrive in roughly the following way: a short time after the shot is fired, a strong vibration appears at the seismophone, due to the wave coming directly at the surface of the earth from the shot to the detector. The vibration soon begins to die away. In the course of the next second or more, waves successively come in from underlying strata interfaces of greater and greater depth, each appearing as a momentary sharp tremor of enhanced intensity. The waves coming from the deeper strata are generally of less amplitude than those from shallower strata. The entire groups of waves which are of practical interest may be completely over within 2 or 3 seconds from the firing of the shot.

In seismograph prospecting, the waves detected and recorded include not only those which are due directly to the shot, and which are modified according to sub-surface structure, but also waves due to extraneous causes. These may be pseudo-seismic waves due to highway traffic, or to vibrations of stationary machinery. They may be due to confused reflections and refractions of the shot waves from nearby boulders, etc. And even in the absence of man-made tremors, the earth is continuauly undergoing minute earth-quakes, due to settling, thermal expansion and contraction, sudden yielding to stresses, etc. Waves due to all these extraneous causes appear on the record and to a greater or less extent confuse and obscure the records of the desired wave (waves which have penetrated deep underground and which give information as to deep structure). These extraneous waves are, so to speak, a kind of static or ground noise, and are often a considerable nuisance; seismic records being usually somewhat difficult to interpret at best. Using a conventional untuned amplifier, there is no way to make any distinction between these undesired waves and the desired waves.

It has been found that the frequency of vibration of the desired seismic waves (frequency is the number of wave vibrations per second) is different from the frequency or range of frequencies of the extraneous vibrations. Hence by providing a tuned amplifier, tuned to the frequency of the desired waves, the ratio of amplitudes of desired waves to undesired waves can be increased, with consequent improvement in the clarity of the record. However, difficulties arise, because the frequency to which the amplifier should be tuned is different for waves coming from different underground strata. The optimum frequency may be, for example, 50 vibrations per second for one tremor, 25 for another and 80 for a third. In conventional amplifiers of the tuned-type, the circuit is tuned for some one frequency range which it is desired to emphasize in the record. But if two or more wave frequencies are of interest, as is often the case, it may be necessary to perform one shot-detecting-recording operation with the amplifier tuned at one frequency, and then repeat the operation with the amplifier tuned at a different frequency. This is laborious.

It has been proposed to adjust the tuning of a seismograph amplifier, according to the amplitude of the received waves; to have the amplifier circuit tune itself for lower frequencies when the amplitude is small. This assumes that amplitude and frequency are directly and simply related, but often the amplitude and the frequency of received waves are not so simply related.

It is sometimes desired to vary the amplification of the seismophone signals, during reception of the various tremors, because of the wide range of amplitudes. Thus it may be desired to have a low amplification factor for the high intensity direct wave, and a progressively higher amplification factor for the weaker, later waves.

According to the present invention I provide a seismograph amplifying system in which the tuning or frequency response is automatically varied as a predetermined function of time, in such manner that each seismic tremor is received under optimum conditions, with maximum suppression of extraneous waves. This result can be achieved in any of several ways. In one embodiment, I provide electronic circuits adapted to vary the tuning of the amplifier circuit as a function of time. In another embodiment, I provide in the amplifier circuit an element which upon mechanical movement causes a change in some characteristics of the circuit, and means for moving the element at a variable rate corresponding to the requirements of the particular seismograph operation in progress. The amplifying system thus includes tuning means, for varying its frequency response, and timing means arranged to control the tuning means.

In the accompanying drawings, I have shown diagrammatically five examples of specific embodiments of the invention.

In the drawings:

Fig. 1 is a diagrammatic showing of a seismograph apparatus having frequency control by mechanical means;

Fig. 2 is a diagram of a modified frequency control system;

Fig. 3 is a diagram of a modified system having frequency and gain control;

Fig. 4 is a diagram of a modification having frequency controlled as a function of time by electronic circuits;

Fig. 5 is a diagram of a modification utilizing an artificial circuit element in securing frequency control; and Fig. 6 is a vector diagram illustrating the phase relationship between the voltages and currents involved in the circuit shown in Fig. 5.

In the drawings, Fig. 1 shows the apparatus as comprising a seismophone, an amplifier circuit, a recorder, and frequency control means. The seismophone is shown conventionally as comprising a case 10, in contact with the earth 11, having an iron pole-piece 12 fixed therein with a coil of wire 13 thereon. A permanent magnet 14 is suspended adjacent the pole piece by springs 15. Upon vibration of the earth the magnet moves with respect to the pole piece and an oscillating current is set up in leads 16 and 17 from the coil. The recorder, like the seismophone, can be of any suitable type, and is shown diagrammatically as comprising an oscillograph element 20 adapted to direct a beam of light 21 upon a traveling sensitized surface 22.

An amplifier tube 23 is provided, having a filament 24, grid 25 and plate 26. The filament is supplied by an "A" battery 27. The output of the seismophone is applied to the tube, lead 16 being connected to the grid and lead 17 to one side of the filament at 28.

Plate 26 is connected by a lead 30 with the grid 31 of an amplifying tube 32, a condenser 33 being inserted in lead 30, as shown. Tube 32 has a filament 34 supplied by an "A" battery, and a plate 36. The plate is connected by a lead 37 with the input coil 38 of a transformer 39, the output coil 40 of which delivers to the oscillograph element through leads 41. Coil 38 is connected to the filament through wire 42, "B" battery 43, connection 44, and to the grid through resistance 45. The filaments of both tubes 23 and 32 are grounded as indicated at 46.

Means are provided for automatically varying the tuning of the amplifier circuit. Between the two tubes is a tuned circuit, comprising a capacitance element (condenser) 50 connected in parallel by wires 51 with an inductance coil 52 mounted on a fixed, iron pole piece 53. This capacitance-inductance combination is connected to lead 30 by a wire 54 and to junction 28 by a wire 55 and "B" battery 56. An iron armature 60, supported on a lever 61 pivoted to a fixed support as at 62, is provided adjacent the pole pieces. The armature is arranged for motion toward and from the pole piece by a cam 63, driven by suitable means such as a motor 64. An extension 65 on the lever rides on the cam as shown. A spring 59 is arranged to keep this extension against the cam. Upon rotation of the cam, the armature 60 moves with respect to pole piece 53. Motion of the armature towards the pole piece increases the inductance; motion away decreases the inductance. The frequency of the inductance-capacitance circuit is given by the expression $f = \frac{1}{2}\pi\sqrt{LC}$, where $f$ is the frequency, L the value of the inductance and C the value of the capacitance, expressed in appropriate units. The apparatus described is in effect a timer controlling the tuning of the amplifier.

The motor also drives an additional cam, 66, cooperating with a switch lever 67, with contact point 68 so as to automatically set off an explosive charge for producing seismic waves. Switch 67 and contact 68 are connected through leads 69 and a battery 70 with an electric blasting cap 71 in an explosive charge 72, buried in the earth as at 73. Cam 66 is conveniently mounted on cam 63, and is angularly adjustable with respect thereto by means of an arcuate slot 74 in cam 66 and a set screw 75 in cam 63. Switch arm 67 is normally out of contact with element 68, but upon rotation of the cam in the direction shown, the end of arm 67 drops into depression 76 on cam 66, causing firing of the shot.

In operation, the aspect of the cams prior to firing the shot is as indicated in Fig. 1. To make a record, the motor 64 is started and the recorder put into operation (that is, the sensitized surface 22 is put in motion). After a brief interval of time, the end of switch arm 67 drops into depression 76, closing the circuit in leads 69 and firing the shot. Cam 63 is so shaped that after a brief interval of time member 65 moves downward onto a depressed portion 80 of the cam, thereby decreasing the inductance and increasing the natural frequency of the inductance-capacitance circuit. The cam is so shaped and the motor speed is such that this change of tuning occurs before the time of arrival of the first or direct wave. The depth of portion 80 is chosen so that the circuit will be tuned to the frequency of the first or direct wave. Waves continue to be received at the seismophone, and the cams continue rotating. Cam 63 is so shaped that member 65 is gradually pushed upward, thereby decreasing the tuning frequency of the amplifier, as waves of lower and lower frequencies reach the seismophone. In the example selected for illustration, there is a certain wave coming from one stratum which is of higher frequency than those coming immediately before and after. Therefore the cam is provided with a depressed portion 81, so that at the time when this wave comes in, element 65 drops, thereby tuning the amplifier for higher frequency in the manner described.

After portion 81 is passed, the cam gradually pushes lever 61 upwards, decreasing the tuning frequency. By the time the train of waves is finished, the cam has returned approximately to starting position and the operation is finished; in most cases the waves are received over a period of a few seconds, and the time for revolution of the cam is adjusted accordingly.

The shape of the cam is determined according to information derived from a previous shot or shots made with known apparatus. It is not necessary to make a new cam for each operation. Ordinarily in a given terrain the subsurface conditions are sufficiently similar over a substantial area, so that one cam will suffice for a plurality of operations. The cam is ordinarily cut out of thin metal, cardboard or other easily shaped material.

While the apparatus is shown in Fig. 1 as having the tuning done by varying an inductance, the same results can be achieved by causing the cam to vary some other characteristic of the circuit; for example the capacitance of the tuning circuit 50—51—52. Fig. 2 illustrates such a modification, wherein the inductance 152 is fixed, and a variable condenser 150 is provided in lieu of the fixed condenser 50 of Fig. 1. The variable condenser is operated by lever 61, through an axle member 85 supported in bearings 62. The rest of the circuit is the same as in Fig. 1.

If desired, the shot can be fired, and the motor 64 started by hand, in which case cam 66 and switch 67—68 are omitted. Any amount of amplification can be added between tubes 23 and 32 if desired, in known ways.

It is seen that my device for varying the tuning of the amplifier circuit provides complete flexibility and capability of adaptation to any particular situation encountered in the field. The frequency-varying cam can be made of any shape whatever to meet requirements, and by adjusting the speed at which the cam is driven, wave trains of any length whatever can be accommodated.

As stated, it is sometimes desirable to control gain (amplification factor) of the amplifier as well as frequency, as a function of time. My invention is equally well applicable to controlling gain. Fig. 3 shows an arrangement embodying automatic gain control, and also shows a modification of the invention wherein actuation of the control means depends upon arrival of the first seismic disturbances at the seismophone. Fig. 3 also serves to illustrate time control of gain, through the agency of an electric circuit, rather than through the agency of mechanical devices (cams, etc.).

In Fig. 3, the system consisting of the seismophone, tube 23, frequency control circuit, amplifier tube 32, transformer 39 and recorder, is identical with that of Fig. 1, except that tube 32 is shown as having a screen grid 31' in addition to grid 31, and the description given in connection with Fig. 1 applies. The elements of the system for controlling gain and initiating action of the several control devices, are as follows: A control tube 100 is provided, having a filament 101 supplied by a battery 102, a grid 103 and a plate 104. The grid is connected to the plate circuit of tube 32 by a lead 105 and condenser 106. The plate 104 is in circuit, through a lead 107, with a sensitive electromagnet 108 and a "B" battery 110, thence connecting with the filament by a lead 111. Lead 111 is connected, through a battery 112 and lead 113, with the filament 34 of tube 32. A resistance 114 is connected across leads 113 and 105. Lead 30 (in ther plate circuit of tube 23) is connected to lead 113 through a circuit comprising a lead 115, resistance 116, variable resistance 117, a pair of (normally open) contacts 118 and 119 and a battery 120. Two capacitances 121 and 122 and a variable resistance 123 are connected as shown.

In addition to cam 63 there is provided a cam 124, advantageously arranged for simultaneous rotation with cam 63. Cam 124 has a depressed portion 125, a rising portion 126 and a prolonged circular portion 127. The cam cooperates with a switch lever 128 pivotally mounted to a fixed support as at 129, and kept in contact with the cam by a spring 130. A weight 131 is arranged to rotate the cams upon release thereof.

The operation of the system of Fig. 3 is as follows: the system remains inactive until vibrations of substantial magnitude reach the seismophone. Thereupon, the voltage fluctuations in the plate circuit of tube 32 pass through condenser 106 and overcome the bias on the grid 103, of tube 100 whereby the plate current of tube 100 flows through electromagnet 108 and energizes the electromagnet 108. Lever 128 is retracted, allowing cam 63 to rotate under the influence of weight 131. Cam 63 during its rotation varies the tuning of the amplifier circuit as explained in connection with Fig. 1. At the instant of retraction of lever 128, contacts 118 and 119 are closed, momentarily, allowing battery 120 to charge condenser 121. Part of the charge on 121 soon leaks off through resistance 117, charging condenser 122 and putting a negative bias on the grid 31 of tube 32. As tube 32 is of the remote cut-off or super-control type, the gain of the amplifier falls off soon after cam 63 starts. However, the charge on 122 gradually leaks off through variable resistance 123 and accordingly the gain increases with time, thereby compensating for the progressive weakening of the later wave arrivals. Should at any time the signal become excessive, tube 100 will again act to close contacts 118 and 119 momentarily, so that negative bias is again applied to the grid of tube 32, thereby limiting the volume.

The forms of apparatus shown in Figs. 1, 2 and 3 with mechanical tuning control, have the advantage of being simple in construction and in operation, and of being very flexible and adaptable to different situations. In Fig. 4 there is shown a modification wherein frequency is automatically varied, not by mechanically-controlled means, but by an electrical circuit. The actual control means makes use of charging and discharging a condenser, and is somewhat similar to the control means shown in the gain control system of Fig. 3. The function of frequency response versus time is exponential or approximately so, and can be adjusted within limits. The circuit of Fig. 4 has no moving parts and is very smooth in operation. For the sake of example, it is shown in connection with an improved superheterodyne amplifier, which per se forms the subject matter of a copending application of R. D. Wyckoff, Serial No. 154,068 filed July 16, 1937. The amplifier proper comprises the following elements, most of which are not shown in detail, as a detailed showing is not essential in understanding the present invention: a seismophone 10, a vacuum-tube amplifier unit 200, a modulator 201, an amplifier unit 202, a filter 203, a detector 204, an output amplifier 205 and a recorder 291, all suitably interconnected as shown. These elements make up a superheterodyne amplifier. Thus, seismic waves are received at the seismophone, amplified at their natural frequency by amplifier 200, and passed to the modulator. In the modulator, a high-frequency control signal is impressed on the seismophone signal (in a manner described post) and there are thus produced two high-frequency side bands which are amplified in amplifier 202. One of the side bands (either one) is selected by filter 203 for further amplification, is detected (204) amplified (205) and recorded (recorder 291). Three amplifiers are shown, but if desired a greater or less number can be employed, and if the signal is very strong they can be omitted altogether. The three stages of amplification can be lumped as a unit, or can be placed between the filter (203) and the detector (204) if desired. One advantage of this amplifier is that the low frequency seismophone signals are converted, by admixture of the high frequency oscillator current, into a modulated high frequency signal which is more conveniently amplified than the original low frequency signal. The heterodyne amplifier is also very well adapted for variable tuning, as described in more detail below.

The seismograph signal and oscillator output are combined in the modulator to create sidebands above and below the oscillator frequency. Each side-band differs from the oscillator frequency by a number of cycles per second equal to the frequency of the seismophone signal to which it corresponds. The filter 203 can be tuned to select one of these side bands. However, if the filter is left fixed, the oscillator can be tuned to shift all of the side-band frequencies so that the fixed filter can select any side-band desired. Thus the oscillator frequency in conjunction with the filter determines the seismophone signal frequency selected by the system. In detail, the modulator comprises a vacuum tube 206, having grids 207, 208, 209, 210, a plate 211, an electron-emitter 212 and a filament 213 energized by a battery 214. Grid 210 is connected to the amplifier (200) by a lead 215. The plate circuit comprises a lead 216 to the second amplifier (202) and a lead 217 from the amplifier, through a B battery 218 and a bias battery 219, to the electron-emitter 212. Grids 208 and 209 are connected to the B battery by a lead 220. Grid 207 is connected, through a lead 221 and a condenser 222, with the oscillator (to be described). A resistance 223 is connected from grid 210 to the ground and a resistance 333 is connected from grid 207 to the ground.

The modulator circuit impresses a high-frequency wave on the seismophone signal, the frequency of which applied signal can be varied by varying the adjustment of the oscillator circuit. In operation, the seismophone signal is impressed on grid 210 of the modulator tube, while a continuous high-frequency current is impressed on grid 207 by the oscillator. The tube thus modulates the high frequency current, according to the seismophone signal (in a way known per se) and the output of the tube, as sent to amplifier 202, contains two side-bands, corresponding respectively to the sum and to the difference of the high frequency current and the signal current.

Referring to the oscillator, this comprises a vacuum tube 230 having grids 231, 233 and 234, plate 235, electron-emitter 236 and filament 237 energized by a battery 238. The plate is connected through lead 240 with an inductance 241, which is tapped at 242 by lead 221. Inductance 241 is connected through a condenser 242A, lead 253, resistance 243, lead 244 and resistance 245, with the electron-emitter. A variable condenser 246 is connected across the inductance and a condenser 247 is connected across resistance 245, as shown.

Batteries 250 and 251 are connected across the inductance and lead 244, as shown. Grid 233 is connected between these batteries by a lead 252, as shown. Grid 231 is connected to lead 253 by a lead 254, as shown. The plate circuit also includes a lead 255, connecting condenser 256, resistance 257, lead 258 and resistances 259 and 260, in series with a stationary contact point 261 of an electromagnetic relay also including an electromagnet 262 and contactor 263, contact 263 being connected through a battery 264 with lead 244. Grid 234 is connected to lead 258 by a wire 265, and to lead 244 through a resistance 266. Condensers 267, 268 and 269, and resistance 270 are connected across leads 271 and 244, as shown.

A generator or blasting machine 275 is provided, adapted upon actuation to set off a source of seismic waves 276, usually a charge of dynamite provided with an electrical blasting cap and buried in the earth. The generator, the source and magnet 262 are connected in series through leads 277, so that upon actuation of the generator the shot is fired and simultaneously relay switch 261—262—263 is closed (momentarily).

Considering the operation of the system: the oscillator supplies a constant frequency modulating current to the modulator tube. The oscillator tube receives part of its bias from battery 264 through resistances 259 and 260. When the bias is most negative, the plate circuit of the tube acts like a reactance of high inductance and has minimum detuning effect on the oscillator circuit formed by inductance 241 and capacitance 246. As the bias is decreased (made more positive) the inductive reactance offered by the tube decreases, and this raises the oscillator frequency. Upon closing the relay switch momentarily at the firing of the shot, condenser 269 is charged. The charge gradually leaks off through resistance 260 into condenser 268. Condenser 268 discharges through resistance 270. The resulting voltage across this resistance is applied to grid 234 through the high resistance 259. This applied voltage rises and falls at time rates depending mostly upon the values selected for elements 260, 268, 269 and 270. The oscillator frequency follows this fluctuation. For example, assume that the rise in voltage is sufficient to raise the oscillator frequency 20 cycles. If the oscillator frequency was originally 30 cycles above the frequency selected by filter 203, the oscillator frequency now becomes 30+20 or 50 cycles above the filter frequency, and the amplifiers will select the 50 cycle frequency.

The direction of the bias or frequency change of the oscillator is not important as the direction of the frequency control is dependent upon whether the upper or lower side band is being selected by the amplifiers. Condenser 246 can be tuned to either side of the resonance of filter 203, so as to select the desired side band. For example, with the control circuit as shown, if it is desired to tune the amplifier to 30 cycles, the oscillator frequency can be set 30 cycles above the frequency of filter 203. In the example given above, if the oscillator be tuned 30 cycles below filter 203, rather than above, the new frequency selected will be 30−20 or 10 cycles.

In lieu of the oscillator shown, any other oscillator circuit can be used in which the oscillator frequency is controllable by a change of electrode potential. The frequency could also be shifted as a function of time by changes in the circuit other than changing the grid bias of tube 230; for example by changing the setting of condenser 246 or by coupling a variable load onto the circuit.

In all cases, the frequency response or tuning of the amplifier is adjusted as a function of time. In the circuit described in connection with Fig. 4, frequency response first rises, then falls. That is, assuming the oscillator to be initially adjusted to tune the circuit to a certain frequency, then as the seismic waves are received, the tuning frequency rises from its initial value for a period of time, and then falls off to lower values. Variation of tuning frequency in this manner makes for substantially clearer records in a large number of cases. The value of the frequency response is determined by leakage of charges off condensers and hence is approximately an exponential function of time.

Fig. 5 shows a modification wherein automatic frequency control is provided, having a filter including an artificial circuit element (a capacitance), the value of which is varied under automatic control as a function of time. The output of the seismophone is amplified by any desired number of amplifiers, three being shown as indicated at 300, 301 and 302. The plate circuit of amplifier 302 is connected by a wire 303 and condenser 304, with an additional amplifier 305, the output of which is delivered to the recorder 291 in known manner.

The plate load impedance of amplifier 302 consists of a tuned parallel circuit, the principal elements of which are a real inductance 306 and a tube 307, having an electron-emitter 308, grid 309, screen grid 299 and plate 312, arranged to act as an artificial capacitance, forming a tunable filter in combination with the inductance. The functioning of this tube is described in detail below. The resonant frequency band passed by this circuit is applied to the grid 310 of tube 311 of amplifier 305, and thence to the recorder. Other frequencies are by-passed through the resonant circuit.

The effective capacitance furnished by tube 307 is a function of the bias applied to the grid 318 of tube 319. Means are provided for varying this bias as a function of time, comprising the following circuit: a battery 264 is connected through relay switch 261—262—263 with a condenser 269, as in Fig. 4. Upon firing the shot by blasting machine 275, switch 261—262—263 is momentarily closed and condenser 269 becomes charged. The condenser is connected in parallel with a variable resistance 315 and condenser 316, which three elements are connected across the electron emitter 317 and grid 318 of the first of a pair of amplifier tubes 319 and 320. An inductance 321 is interposed in the grid circuit as shown, and a variable resistance 322 is provided. The value of the capacitance is varied as a function of time, by a control means similar to that provided in Fig. 3. The functioning of the circuit will be clear from the description to follow in connection with Fig. 6. The bias across resistance 315 is varied as a function of time. This bias controls the gain of the feed back amplifier and thereby controls the resonant frequency of the amplifier. Phase control for selectivity of the filter combination is provided by a variable resistance 322A connecting grid and electron-emitter of the artificial capacitance tube.

The functioning of the artificial capacitance tube and its circuit is best understood by a consideration of a vector diagram illustrating the phase relationship between the several voltages and currents involved. Such a diagram is shown in Figure 6, which applies to the circuit of Figure 5. The diagram shows the vector relationship between the voltage applied and current flowing at the plate 312 of tube 307. By showing that the current through the tube leads the voltage applied to the tube by 90 degrees, it will be proved that the tube behaves as a capacitance. It can also be shown that the capacitance current through the tube is proportional to frequency, as in a real condenser, and thus proved that the tube behaves like a condenser over a large frequency range, so that it will resonate with an inductance connected in parallel with it; behaving in this respect like known capacitance-inductance combinations.

In Figure 6 a horizontal vector $E_{312}$ represents the applied alternating voltage due to an amplified seismophone signal. This voltage will cause current to flow through the resonant circuit 306—307. The inductive branch 306 behaves in a well-known manner and it is only necessary to prove that the other branches in combination act like a capacitance. The current flowing into the artificial capacity circuit can be divided into three components. First, there will be a small component $I_{323}$ flowing through blocking condenser 323, resistor 324, inductance 321 and by-pass condenser 316 to ground. A second component $I_r$ will flow through tube 312 due to the plate voltage fluctuations. The third and principal component $I_b$ will be due to the grid voltage fluctuations, and therefore to the characteristics of the feed-back circuit. The first two currents are small and resistive in nature. Furthermore, they can be counteracted by making $I_b$ lead $E_{312}$ by slightly more than 90 degrees, as will be demonstrated later, and so they will be omitted from the demonstration for the sake of simplicity.

$I_b$ is created as follows: $E_{312}$ causes a slight flow of current, $I_{323}$ through the feed-back circuit as mentioned previously. This current is limited mostly by a large resistance 324, as inductance 321 has low reactance and condensers 323 and 316 have extremely low reactances. The cur- I323 is therefore small and lags E312 by a small angle. This current is nearly 90 degrees behind the voltage E318 which it causes in inductance 321. After amplification in tube 319, this voltage E318 becomes E325, increased in amplitude and shifted practically 180 degrees. E325 is slightly decreased and shifted in the interstage coupling network 328—329—330, becoming E326 at grid 326. It is again amplified in tube 329, becoming E327 which is shifted to E309 by the coupling network 331—332—322A. E309 leads E327 because of the capacity reactance of condenser 332. The phase shift between E327 and E309 can be controlled by varying resistor 322A. Other phase-shift networks can of course be used, and any degree of phase shift control can be made available. The plate current Ifb due to feed back will be in phase with the grid voltage E309. Therefore Ifb can be adjusted to either side of the 90 degrees position as indicated by the dotted arrowheads, by merely adjusting the phase shift with resistor 322.

The tube capacitance remains practically constant for any phase angle around 90 degrees, but the resistive component of the tube impedance will vary from high positive values through zero to high negative values as the phase angle is increased. The values above 90 degrees, where negative resistance occurs, may be used if it is desirable to cancel out some of the resistance in the circuit to sharpen the resonance of the tuned circuit. This can in fact be carried to the point where the feed-back amplifier goes into oscillation. The values below 90 degrees throw more resistance into the circuit and make the circuit tune broadly.

Resistor 322 therefore behaves as a band-width control because it shifts the phase angle or power factor of the artificial capacitance.

The amount of current flowing through tube 307 for a given applied voltage and frequency determines the value of the apparent capacitance. This current is proportional to the feed-back voltage. The feed-back voltage delivered at inductance 321 is proportional to frequency because the current through the high resistance feed-back circuit is substantially constant and independent of frequency, and the reactance of 321 is proportional to frequency. It follows that the current Ifb is proportional to frequency as in a real condenser. The amount of feed-back voltage can be varied to change the value of capacitance and the resonant frequency of the circuit. This is done conveniently by varying the gain of the amplifier, by adjusting the grid bias on one or more of the feed-back amplifier tubes, as at resistor 315 in the control circuit previously described.

The values of the various elements of the feed-back amplifier are designed to give the proper gain and phase shift, and to make the amplifier stable over the entire frequency range so that it will not oscillate at any frequency. This requires careful design of all the circuits. The condition of stability occurs if the following criterion is satisfied: if M is the gain of the feed-back amplifier expressed as a vector, and B is the fractional feed-back expressed as a vector, then the locus of all MB vector products over the entire frequency range must not enclose the point 1,0° on a polar diagram. As the capacity current is shifted beyond 90 degrees leading, the point on the MB locus corresponding to the operating frequency should be the first to approach and encircle point 1,0°. This insures that sharp resonance can occur at desired frequencies before oscillation can occur at any other frequency. Special networks may be required in some cases where the MB diagram is not satisfactory. Such networks are merely phase-and-gain-controlling filters which are well known in the communication art and need not be described here.

What I claim is:

1. In seismograph apparatus having an electrical seismophone arranged to produce signals of various frequencies corresponding to terrestrial vibrations and varying with time, some of which signal frequencies it is desired to record, the combination of an electronic amplifier circuit connected therewith and a recorder connected to the amplifier circuit, variable tuning means for the amplifier circuit, and timer means operating independently of fluctuations in signal amplitude and constructed and arranged to adjust the tuning means as a predetermined function of elapsed time during receipt of the signals, such as to maintain the amplifier tuned for receipt of the desired signals.

2. In seismograph apparatus having an electric seismophone arranged to produce signals of various frequencies corresponding to terrestrial vibrations and varying with time, the combination of an electronic amplifier circuit and a recorder connected to the amplifier circuit, electronic circuit means for tuning the amplifier circuit, said electronic circuit tuning means being adapted to be varied by varying a potential therein, and timer means operating independently of signal amplitude fluctuations and constructed and arranged for varying said potential as a predetermined function of elapsed time during receipt of the signals, so as to keep the amplifier tuned for receipt of desired signals.

3. In seismograph apparatus having an electric seismophone arranged to produce signals of various low frequencies corresponding to terrestrial vibrations and varying with time, the combination of an electronic amplifier circuit and a recorder connected therewith, a modulator in the amplifier circuit, means for supplying an oscillating current of relatively high frequency to said modulator, for mixing with said low frequency signals to produce two readily amplifiable side bands, filter means adapted to pass a range of frequencies in one of said side bands and means for varying the frequency of said oscillating current during receipt of signals, as a function of time such that the side band frequencies applied to the filter correspond to the signals which it is desired to record.

4. In seismograph apparatus having an electric seismophone adapted to produce electrical signals of various relatively low frequencies corresponding to terrestrial vibrations and varying with time, the combination of an electronic amplifier circuit and a recorder, a modulator in the amplifier circuit, multi-element vacuum tube oscillator means for supplying a relatively high frequency oscillating current to said modulator whereby to produce side bands, the frequency of said current being dependent upon potential applied to an element of the vacuum tube, filter means for selecting a range of frequencies in one of said side bands, detecting means for the filtered signal frequencies, and means for varying said potential on one element of the tube of the oscillator means, during receipt of signals, as a predetermined function of time such that the side band frequencies applied to the filter correspond to the signals which it is desired to record.

5. In seismograph apparatus having an electric seismophone adapted to produce electrical signals of various frequencies corresponding to terrestrial vibrations and varying with time, the combination of an electronic amplifier circuit and a recorder connected therewith, electronic circuit means for varying an electric frequency characteristic of the the amplifier circuit, said circuit means being adapted to be varied by varying the magnitude of a potential therein, and means operating independently of signal amplitude fluctuations and constructed and arranged for varying said potential as a predetermined function of time so as to tune the amplifier circuit, during reception of the seismophone signals, for reception of desired frequencies.

6. In seismograph apparatus having an electrical seismophone adapted to produce electrical signals of various frequencies corresponding to terrestrial vibrations and varying with time, some of which signal frequencies it is desired to record, the combination of an electronic amplifier circuit connected therewith and a recorder connected to the amplifier circuit, variable tuning means for the amplifier circuit, means operating independently of signal amplitude fluctuations and constructed and arranged for adjusting the tuning means as a predetermined function of time so as to keep the amplifier circuit tuned for the desired signals, and means for initiating action of said adjusting means upon receipt of the first seismic waves at the seismophone.

7. Seismograph apparatus comprising an electronic seismophone adapted to produce relatively low frequency signals corresponding to terrestrial vibrations, said signals varying with time and being initially of low frequencies, then of higher frequencies and finally again of lower frequencies, an electronic amplifier of the heterodyne type, a recorder, an oscillator for the amplifier including a vacuum tube and so constructed and arranged that the emitted frequency of the oscillator, and hence the tuning of the amplifier, depends on the grid bias of the oscillator, a condenser, means for charging the condenser upon receipt of the first seismic waves at the seismophone, resistance means, a second condenser connected to the first condenser through said resistance means whereby the initial charge on the first condenser can leak off and charge the second condenser, a second resistance, and means connecting said second condenser and second resistance to the oscillator tube grid whereby leakage of the charge off the second condenser varies the bias of the grid so that the amplifier is initially tuned for a certain frequency, and the tuning gradually changes for higher frequencies, and then falls off to lower frequencies, irrespective of signal amplitude fluctuations.

8. In seismograph prospecting, the method of amplifying and recording seismophone signals of fluctuating amplitude and of various frequencies corresponding to terrestrial vibrations and varying with time, some of which signal frequencies it is desired to record and others to suppress, which method comprises amplifying the signals in a circuit having a variable selective frequency response, changing the frequency response as a predetermined function of time independently of fluctuations in signal amplitude so as to keep the circuit tuned for the desired signal frequencies, and recording the selected amplified signals.

9. In seismograph prospecting, the method of amplifying and recording seismophone signals of various frequencies corresponding to terrestrial vibrations and varying with time, some of which signal frequencies it is desired to record and others to suppress, which method comprises impressing the signals on an amplifier circuit which includes two elements, viz. an inductance and a capacitance, arranged to act as a wave filter, changing the effective value of one of said elements as a predetermined function of time independently of fluctuations in signal amplitude, whereby to vary the frequency response of the circuit as a function corresponding to the variation in the signal frequencies which it is desired to record, and recording the selected amplified signals.

10. In seismograph apparatus, an electrical seismophone adapted to be placed in vibration-receiving relationship with the earth and to produce electrical signals of fluctuating amplitude and of various frequencies corresponding to earth vibrations, said signal frequencies varying with time and some of said signal frequencies it being desirable to record, an electronic amplifier circuit arranged to receive signals from the seismophone, a recorder connected to the amplifier circuit, variable tuning means for the amplifier circuit, and timer means so constructed and arranged as to continuously adjust the tuning means for maximum reception of said desired signal frequencies, during receipt of the seismophone signals; said timer means being arranged to function independently of fluctuations in signal amplitude.

11. A method of seismograph prospecting which comprises producing seismophone signals of fluctuating amplitude and of varying frequencies corresponding to terrestrial vibrations, which signal frequencies vary with time, amplifying the signals in a tuned circuit, and varying the tuning of the circuit as a predetermined function of time, during receipt of the signals, independently of fluctuations in signal amplitude, so as to select from the seismophone signals those signal frequencies which correspond to reflections or refractions from buried strata.

12. In a seismograph apparatus having an electrical seismophone arranged to produce signals of fluctuating amplitude and of various frequencies corresponding to terrestrial vibrations, which signal frequencies vary with time and some of which frequencies it is desired to record, an electronic amplifier circuit connected therewith and a recorder connected to the amplifier circuit, the improvement which comprises variable tuning means for the amplifier circuit, and timer means operating independently of the amplitude of the received signals and constructed and arranged to vary the tuning, during receipt of signals, in a predetermined function of elapsed time, such as to produce, during receipt of signals, approximately the maximum ratio of signal strength of desired signals, to signal strength of undesired signals.

GARY MUFFLY.